US010225772B2

(12) United States Patent
Gemelos et al.

(10) Patent No.: US 10,225,772 B2
(45) Date of Patent: Mar. 5, 2019

(54) MOBILITY MANAGEMENT FOR WIRELESS COMMUNICATION NETWORKS

(71) Applicant: AT&T Intellectual Property I, L.P., Atlanta, GA (US)

(72) Inventors: Steven Gemelos, San Jose, CA (US); Julius Mueller, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/630,494

(22) Filed: Jun. 22, 2017

(65) Prior Publication Data

US 2018/0376390 A1 Dec. 27, 2018

(51) Int. Cl.

| | |
|---|---|
| ***H04W 4/00*** | (2018.01) |
| ***H04W 36/00*** | (2009.01) |
| ***H04W 8/08*** | (2009.01) |
| *H04W 24/02* | (2009.01) |
| *H04W 60/04* | (2009.01) |

(52) U.S. Cl.

CPC ......... *H04W 36/0094* (2013.01); *H04W 8/08* (2013.01); *H04W 36/0005* (2013.01); *H04W 36/0016* (2013.01); *H04W 24/02* (2013.01); *H04W 60/04* (2013.01)

(58) Field of Classification Search

CPC ......... H04W 36/0005; H04W 36/0016; H04W 36/0094; H04W 8/08

USPC .................. 370/331–334, 338; 455/436–444

See application file for complete search history.

(56) References Cited

U.S. PATENT DOCUMENTS

| | | | | |
|---|---|---|---|---|
| 9,002,757 | B2 | 4/2015 | Kojima | |
| 9,055,486 | B2 | 6/2015 | Farhadi | |
| 9,104,497 | B2 | 8/2015 | Mortazavi | |
| 9,325,468 | B2 | 4/2016 | Mitola, III | |
| 9,391,749 | B2 | 7/2016 | Amanna, III et al. | |
| 9,467,918 | B1 | 10/2016 | Kwan | |
| 9,565,074 | B2 | 2/2017 | Lehane et al. | |
| 9,565,111 | B2 | 2/2017 | Vasseur et al. | |
| 2010/0056149 | A1 * | 3/2010 | Jubin ................ | H04W 36/0094 455/436 |

(Continued)

FOREIGN PATENT DOCUMENTS

| | | | |
|---|---|---|---|
| CN | 101132363 | B | 12/2010 |
| CN | 102238631 | A | 11/2011 |

*Primary Examiner* — Thai D Hoang

(74) *Attorney, Agent, or Firm* — Amin, Turocy & Watson, LLP

(57) ABSTRACT

Mobility management for wireless communication networks is provided. A method can include determining, by a device comprising a processor, expected utilities respectively for a group of network actions on behalf of a user equipment in a communication network based on an observed state of network devices of the communication network, selecting, by the device, a network action from the group of network actions having at least a threshold expected utility, resulting in a selected network action, determining, by the device, an adjustment parameter for the selected network action based on a conformity of the selected network action to a network policy applicable to the communication network, and based on the adjustment parameter, adjusting, by the device, an expected utility of the expected utilities corresponding to the selected network action to account for the observed state of the network devices of the communication network.

20 Claims, 11 Drawing Sheets

900

902: DETERMINE EXPECTED UTILITIES RESPECTIVELY FOR A GROUP OF NETWORK ACTIONS ON BEHALF OF A USER EQUIPMENT IN A COMMUNICATION NETWORK BASED ON AN OBSERVED STATE OF DEVICES OF THE COMMUNICATION NETWORK

904: SELECT A NETWORK ACTION FROM THE GROUP OF NETWORK ACTIONS HAVING AT LEAST A THRESHOLD EXPECTED UTILITY

906: DETERMINE AN ADJUSTMENT PARAMETER FOR THE SELECTED NETWORK ACTION BASED ON A CONFORMITY OF THE SELECTED NETWORK ACTION TO A NETWORK POLICY APPLICABLE TO THE COMMUNICATION NETWORK

908: BASED ON THE ADJUSTMENT PARAMETER, ADJUST AN EXPECTED UTILITY OF THE EXPECTED UTILITIES CORRESPONDING TO THE SELECTED NETWORK ACTION TO ACCOUNT FOR THE OBSERVED STATE OF THE NETWORK DEVICES OF THE COMMUNICATION NETWORK

(56) References Cited

U.S. PATENT DOCUMENTS

| | | | | |
|---|---|---|---|---|
| 2011/0269462 | A1* | 11/2011 | Sagfors | H04W 36/36 455/436 |
| 2013/0273917 | A1* | 10/2013 | Sfar | H04W 36/0094 455/436 |
| 2014/0269618 | A1* | 9/2014 | Surface | H04W 36/0083 370/331 |
| 2014/0269620 | A1* | 9/2014 | Surface | H04W 36/24 370/331 |
| 2015/0092746 | A1* | 4/2015 | Jang | H04W 24/08 370/331 |
| 2016/0183238 | A1 | 6/2016 | Buthler | |
| 2016/0198385 | A1* | 7/2016 | Braun | H04W 36/0094 455/437 |
| 2016/0366565 | A1 | 12/2016 | Fjelberg et al. | |
| 2017/0011308 | A1 | 1/2017 | Sun et al. | |

* cited by examiner

MOBILITY MANAGEMENT FOR WIRELESS COMMUNICATION NETWORKS

TECHNICAL FIELD

The present disclosure relates to wireless networks, and in particular, to techniques for mobility management in a wireless communication network.

BACKGROUND

Advancements in wireless communication technology have led to an ever-increasing number of mobile devices and mobile communication services. Today's mobile communication devices are powerful and versatile devices that enable a user to watch video, listen to music, browse the internet, and perform many other tasks on the go without cumbersome computing or multimedia equipment. Similarly, wireless communication networks are advancing and expanding to provide richer and more robust services via a growing number of radio access technologies. As wireless communication technology continues to advance, it is desirable to implement techniques that more efficiently use network resources in order to improve user experience and satisfaction under varying network conditions.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
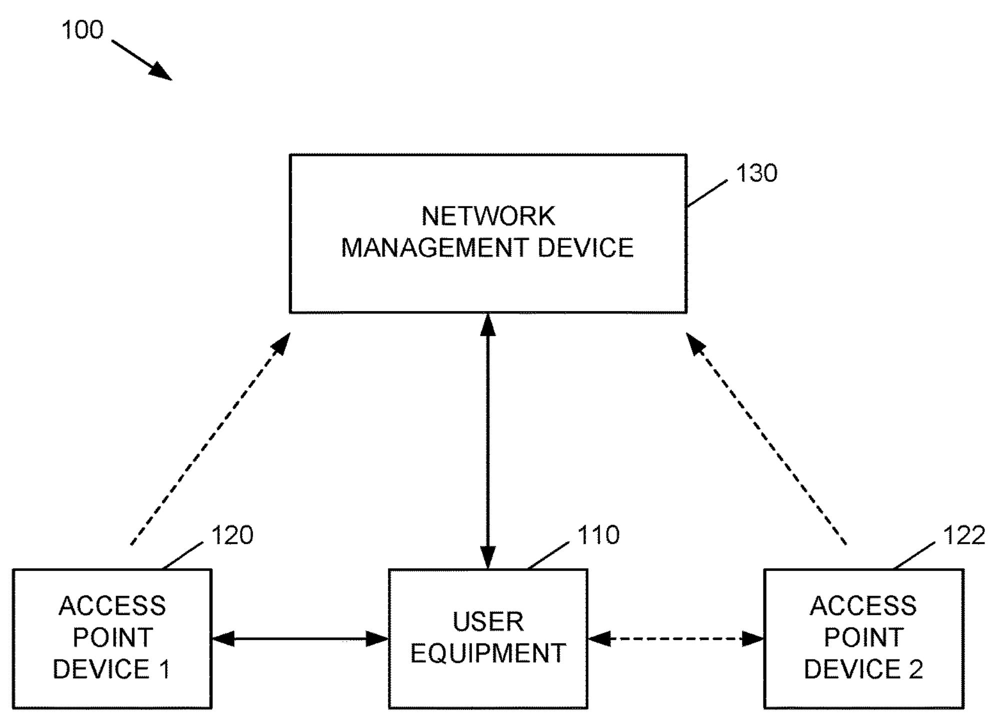
FIG. 1 is a block diagram of a system for managing network resources in a wireless communication system.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include determining, by a device comprising a processor, expected utilities respectively for a group of network actions on behalf of a user equipment in a communication network based on an observed state of network devices of the communication network. The group of network actions can include remaining on a serving access point device of the network devices and engaging in a handoff from the serving access point device to a target access point device of the network devices. The method can further include selecting, by the device, a network action from the group of network actions having at least a threshold expected utility, resulting in a selected network action. The method can also include determining, by the device, an adjustment parameter for the selected network action based on a conformity of the selected network action to a network policy applicable to the communication network. The method can additionally include adjusting, by the device and based on the adjustment parameter, an expected utility of the expected utilities corresponding to the selected network action to account for the observed state of the network devices of the communication network.

In another aspect, a system as described herein can include a processor and a memory that stores executable instructions that, when executed by the processor, facilitate performance of operations. The operations can include determining expected utilities respectively for a group of network actions on behalf of a user equipment in a communication network based on an observed state of network devices of the communication network, the group of network actions including remaining on a serving access point device of the network devices and engaging in a handoff from the serving access point device to a target access point device of the network devices; selecting a network action from the group of network actions having at least a threshold expected utility, resulting in a selected network action; determining an adjustment parameter for the selected network action based on a conformity of the selected network action to a network policy applicable to the communication network; and, based on the adjustment parameter, adjusting an expected utility of the expected utilities corresponding to the selected network action to account for the observed state of the network devices of the communication network.

In a further aspect, a machine-readable storage medium as described herein can include executable instructions that, when executed by a processor, facilitate performance of operations. The operations can include determining expected utilities respectively for a group of network actions on behalf of a user equipment in a communication network based on an observed state of network devices of the communication network, the group of network actions including remaining on a serving access point device of the network devices and engaging in a handoff from the serving access point device to a target access point device of the network devices; selecting a network action from the group of network actions having at least a threshold expected utility, resulting in a selected network action; determining an adjustment parameter for the selected network action based on a conformity of the selected network action to a network policy applicable to the communication network; and, based on the adjustment parameter, adjusting an expected utility of the expected utilities corresponding to the selected network action to account for the observed state of the network devices of the communication network.

Referring first to FIG. 1, a system 100 for managing network resources in a wireless communication system is illustrated. The system 100 includes a user equipment (UE) 110, which can communicate with one or more access point devices (APs) 120, 122. Each of the APs 120, 122, and/or a geographic area for which the APs 120, 122 provide communication service, may alternatively be referred to as cells. Collectively, the UE 110 and APs 120, 122 can form at least a portion of a wireless communication system. While only one UE 110 and two APs 120, 122 are illustrated in FIG. 1 for simplicity of illustration, it should be appreciated that a wireless communication network can include any number of UEs, APs, and/or other devices.

Here, the AP 120 is a serving access point for the UE 110, which is denoted in FIG. 1 as a solid line between the AP 120 and the UE 110. As additionally shown in FIG. 1, the UE 110 and APs 120, 122 can be communicatively coupled to a network management device 130 that allocates communication resources among the devices of the network. The network management device 130 can, among other functions, instruct the UE 110 to engage in a handoff or other procedure by which the serving AP for the UE 110 changes (e.g., from AP 120 to AP 122).

In an aspect, the network management device 130 can be any device that is operable to control the flow of communication between respective other devices in system 100. For instance, the network management device 130 can be a core network component and/or an edge network component such as a Mobility Management Entity. Also or alternatively, one or more of the UE 110 and/or the APs 120, 122 can implement some or all of the functionality of the network management device 130 to manage their own communications and/or communications by other devices in the network. Additionally, while only one network management device 130 is illustrated in FIG. 1, it can be appreciated that the functionality of the network management device 130 could be distributed among multiple devices. Other implementations are also possible.

As mobile network technology advances, densifies and diversifies, new radio network technologies (radio access technologies) are emerging. Today's mobile users have the ability to receive connectivity through various technologies such as 2G, 3G, 4G, Wi-Fi, LTE-Advanced, etc. Additional radio access technologies, such as 5G, are also being developed and will be available in the future. In these and/or other networks, connectivity can be classified through characteristics such as throughput, latency, reliability or a combination thereof. The locality aspect of data and services (e.g., through a multi-access edge cloud) can additionally impact connectivity, which can be related to perceived latency on a wireless device by a user of that device. For instance, content or services located at the edge of the network close to a UE attached to a cell tower can be received faster compared to content or services hosted in a centralized cloud data center.

In addition to the above, wireless communication devices themselves and the applications that can be utilized by such devices are also diversifying. For instance, devices such as smartphones, internet-of-things devices, connected cars, augmented reality/virtual reality headsets, or the like, can leverage wireless communication networks for various applications. As the number of devices and the applications used by those devices increases, the network bandwidth utilized by those devices and applications similarly increases, thereby increasing the desirability of effective network resource management. Various network devices utilize specific network characteristics to operate optimally and improve quality-of-experience for their uses. As a result, it is desirable as a network operator to consider which device should connect to which network in which context.

Existing network management techniques utilize static rules to manage network resources. These techniques can utilize various forms of mobility, such as vertical and/or horizontal mobility (or inter- and/or intra-3GPP mobility). The horizontal mobility approach keeps the radio technology utilized prior to a handover but changes the association of a UE from one base station to another base station based on signal strength. In contrast, the vertical handover approach changes the radio technology through, e.g., executing a handover from LTE to Wi-Fi or vice versa. Both of these approaches are statically defined through policies or signal strength and do not take context information into account. Other parameters, such as data or service locality or network capacity, user preferences, date time, location or service type are also not taken into account.

As a further example of a mobility management scheme for a smartphone or other wireless communication device with both cellular and Wi-Fi communication capability, the cellular macro-network can be selected for communication except when the device has access to a Wi-Fi network and the signal strength is sufficient. Various techniques herein utilize techniques to dynamically allocate network resources, thereby improving connectivity of respective devices in the network. For instance, techniques described herein can leverage knowledge of the available network capacity, end-to-end throughput and/or latency to allocate network resources. Also or alternatively, techniques described herein can consider historical mobility patterns, such as a daily commute from home to work and back.

In an aspect, the network management device 130 can utilize a dynamic approach to network resource management that takes throughput, utilization, spectrum, beamforming, user mobility, latency, the combination of user and service locality through a network topology, and/or other factors into account. The network management device 130 can utilize the concept of reinforcement learning to interact with the network in two ways. Firstly, the network management device 130 can observe the system through monitoring and telemetry. Secondly, the network management device 130 can adjust parameters of the system by enforcing dynamic rules and/or policies.

Figure 2:
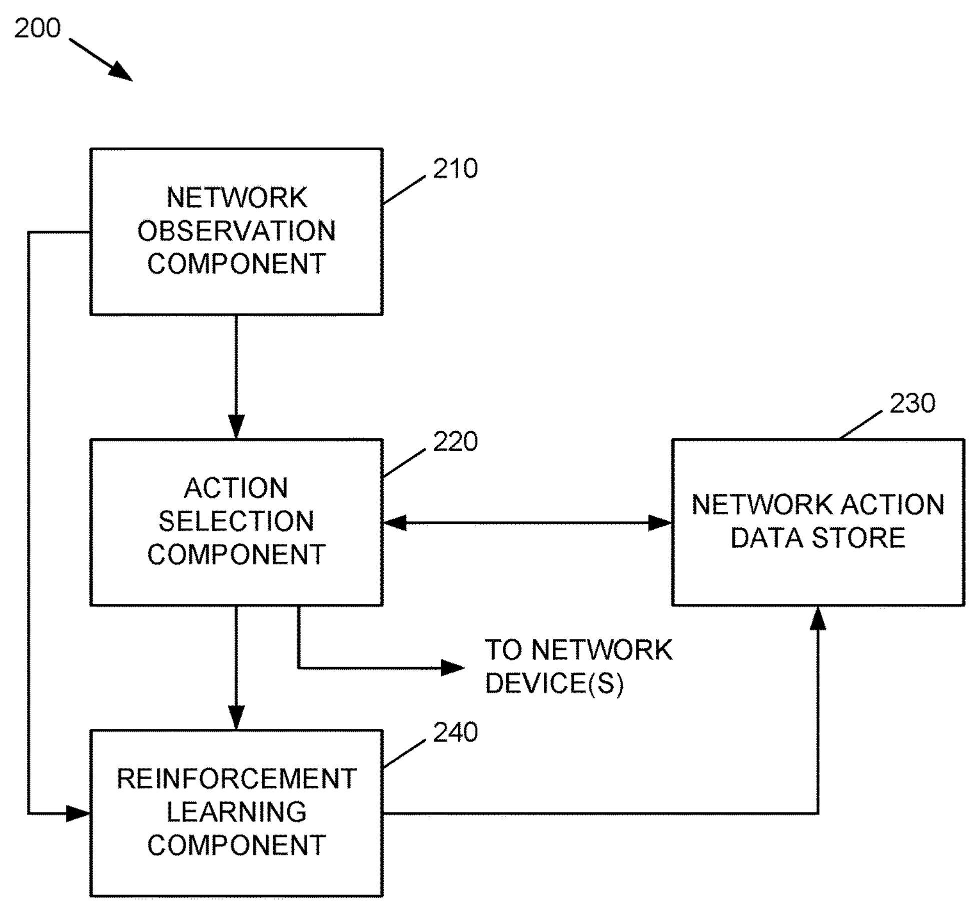
FIG. 2 is a block diagram of a system for active wireless communication network management using reinforcement learning.

Referring next to FIG. 2, a system 200 for active wireless communication network management using reinforcement learning is illustrated. The system 200 can be implemented by, e.g., the network management device 130 and/or any other device(s) in a wireless communication network that are configured to allocate or otherwise manage network resources.

As shown by FIG. 2, the system 200 includes a network observation component 210 that observes an associated communication network, and/or one or more devices in the network, with respect to one or more properties. By way of specific, non-limiting example, the network observation component 210 can observe one or more properties of a UE including, but not limited to, the serving AP for the UE, requested application throughput, physical location (e.g., given in x-y or latitude-longitude coordinates) of the UE, transmit power level, current throughput, transmit power levels of respective access points as observed by the UE, etc. By way of further non-limiting example, the network observation component 210 can observe one or more properties of an access point or cell including, but not limited to, a number of connected UEs, communication capacity (e.g., channel capacity, radio link capacity, uplink capacity, etc.), physical location (e.g., given in x-y or latitude-longitude coordinates) of the UE a communication capacity of the serving AP, or a physical location of the access point or cell, etc. By way of additional non-limiting example, the network observation component 210 can analyze network properties such as access point load balancing, types of services provided by the network, related subscriptions, and/or associated cost per bit, delay between UE and a requested service, packet loss and/or other measures of connection reliability, etc. Other network properties could also be used.

From the above and/or other properties, the network observation component 210 can provide information relating to an observed state of an associated communication network to an action selection component 220. The action selection component 220, in turn, can utilize the network state information to select an appropriate network action for one or more devices in the network, such as a UE and/or another suitable device.

In an aspect, the action selection component 220 can determine expected utilities respectively for a group of network actions on behalf of a UE in the communication network based on the observed state of network devices of the communication network, e.g., as provided by the network observation component 210. The action selection component 220 can utilize a network action data store 230, which stores information relating to network actions and their corresponding expected utility under various network conditions. For example, the network action data store 230 can contain a two-dimensional array for a given network device (e.g., a UE, etc.) in the network that maps observed states of a communication network to respective actions. These actions could include, but are not limited to, remaining on a serving AP of a network device or engaging in a handoff from the serving AP to a target AP of the network device. Other data types and/or structures could also be used.

In an aspect, the action selection component 220 can select an appropriate network action based on the respective expected utilities of different potential actions. For instance, the action selection component 220 can select a network action from a group of possible network actions that has at least a threshold expected utility. The threshold expected utility can be absolute or relative to other possible network actions. For instance, the threshold can be relative such that an action having a highest expected utility or an expected utility within a predetermined amount of the highest expected utility is selected.

Upon selection of an action, the action selection component 220 can issue an instruction and/or other information to the associated network device to facilitate the selected action being taken at the associated device. The action selection component 220 can provide instruction directly or indirectly. For instance, an instruction intended for a UE can be given to the UE directly or to a serving AP for the UE, which in turn will relay the instruction to the UE.

As further shown in FIG. 2, the action selected by the action selection component 220, as well as the corresponding network state information observed by the network observation component 210, can be provided to a reinforcement learning component 240 that utilizes reinforcement learning to dynamically refine the actions selected by the action selection component 220.

In an aspect, the reinforcement learning component 240 analyzes the observed state of the communication network and the selected action and determines an adjustment parameter for the selected network action based on a conformity of the selected network action to a network policy applicable to the communication network. The network policy can be based on, e.g., quality of service constraints associated with a UE and/or other UEs served by a same cell and/or AP. In one example, these quality of service constraints are specified by service level agreements for the respective UEs. Other definitions can also be used.

Based on the determined adjustment parameter, the reinforcement learning component 240 can adjust an expected utility corresponding to the action selected by the action selection component 220 to account for the observed state of the network devices of the communication network. For instance, the reinforcement learning component 240 can utilize one or more machine learning algorithms to adjust a utility value stored at the network action data store 230 corresponding to the observed network state and the selected action.

As a result of the adjustment performed by the reinforcement learning component 240, subsequent actions selected by the action selection component 220 can allocate resources between devices in the associated communication network more efficiently and with improved versatility. Various techniques that can be utilized by the reinforcement learning component for modifying expected utility data are described in further detail below.

Figure 3:
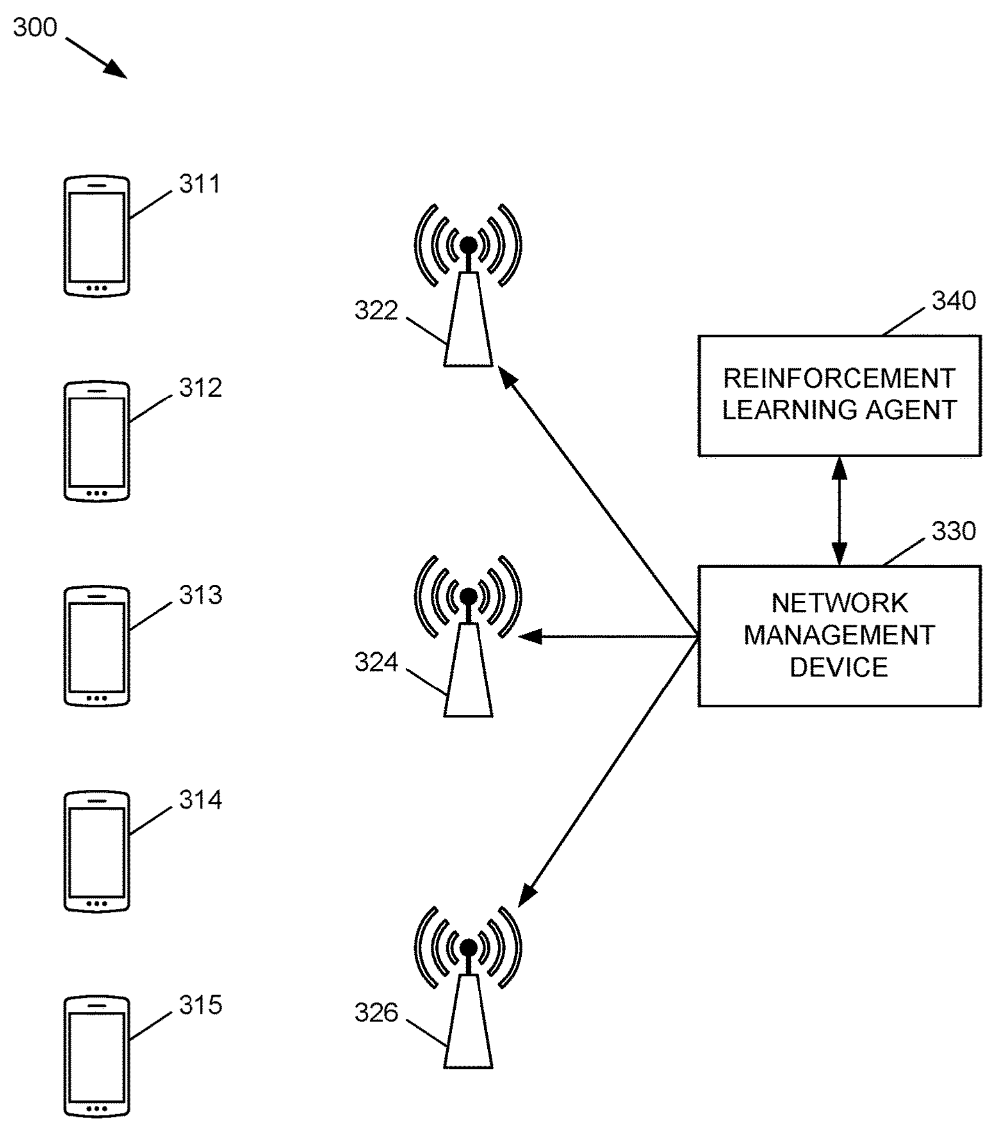
FIG. 3 is a diagram depicting a wireless communication network that utilizes reinforcement learning for network mobility management.

Turning to FIG. 3, diagram 300 illustrates a wireless communication network that utilizes reinforcement learning for network mobility management in accordance with various embodiments described herein. The network shown in diagram 300 includes one or more UEs 311, 312, 313, 314, 315, which can respectively communicate with respective APs (or cells) 322, 324, 326. While FIG. 3 illustrates a network having 5 UEs and 3 APs for simplicity of illustration, it should be appreciated that the network could include any number of UEs, APs, and/or other devices.

As further shown in diagram 300, the network includes a network management device 330 that can be utilized to manage bandwidth and/or resources associated with the network. In on example, the network management device 330 can be, e.g., a switching device and/or another device in communication with the APs 322-326 and/or UEs 311-315. It should be appreciated, however, that the network management device 330 could also be implemented wholly or in part by one or more of the UEs 311-315, APs 322-326, and/or other devices.

As additionally shown in FIG. 3, a reinforcement learning agent 340 can be communicatively coupled to the network management device 330 and configured to refine resource allocation decisions made by the network management device 330 in order to improve network efficiency and overall quality of experience via one or more reinforcement learning techniques. While the reinforcement learning agent 330 is illustrated as separate from the network management device 330, it should be appreciated that the reinforcement learning agent 340 could be implemented wholly or in part by the network management device 330, which in turn could be implemented wholly or in part by one or more UEs 311-315 and/or APs 322-326.

In an aspect, the reinforcement learning agent 340 enables granular and dynamic control over communication resources in a wireless network with improved effectiveness and ease of use over conventional rules-based approaches. Rules-based approaches generally utilize many rigid rules (e.g., take X action if Y event occurs), and this framework makes such approaches difficult to manage in a large and dynamic network. By way of example, rules designed for a normal workday may not be efficient for a baseball game or other special event. In contrast, reinforcement learning provides means by which a network operator can define a network policy, e.g., a goal to be achieved, such that the reinforcement learning agent 340 learns how to achieve that goal with minimal to no further input from the operator. In this way, network efficiency can be improved in such a way that the complexities of the network are substantially hidden from the operator.

In another aspect, the reinforcement learning agent 340 can be instructed regarding what it can observe (e.g., signal power, number of devices, service type, throughput, latency, etc.), what actions it can take (e.g., handoff, adjust signal power, beam forming), and/or a reward signal (e.g., a reward based on the network policy). The reinforcement learning module can then utilize these observations to provide adjustments with improved effectiveness as compared to setting up strict policies.

Example operations of the reinforcement learning agent 340 for a given wireless communication network can proceed as follows. First, the reinforcement learning agent 340 can interact with a dynamic environment, e.g., a wireless communication network, in which it performs respective actions. Next, the reinforcement learning agent 340 can receive feedback in terms of rewards or punishments (negative rewards) based on the actions taken. Through interaction with the environment and the corresponding feedback, the reinforcement learning agent 340 can over time learn the appropriate actions to accomplish given tasks.

The reinforcement learning agent 340 can be trained via rewards or other feedback to establish conformity of selected network actions with a network policy associated with respective devices in the communication network. By way of specific, non-limiting example, this policy can establish quality standards for respective device types (e.g., smartphones, IoT devices, etc.), application types (e.g., video streaming, browsing, etc.), quality of service levels, or the like. Other considerations could also be taken.

Figure 4:
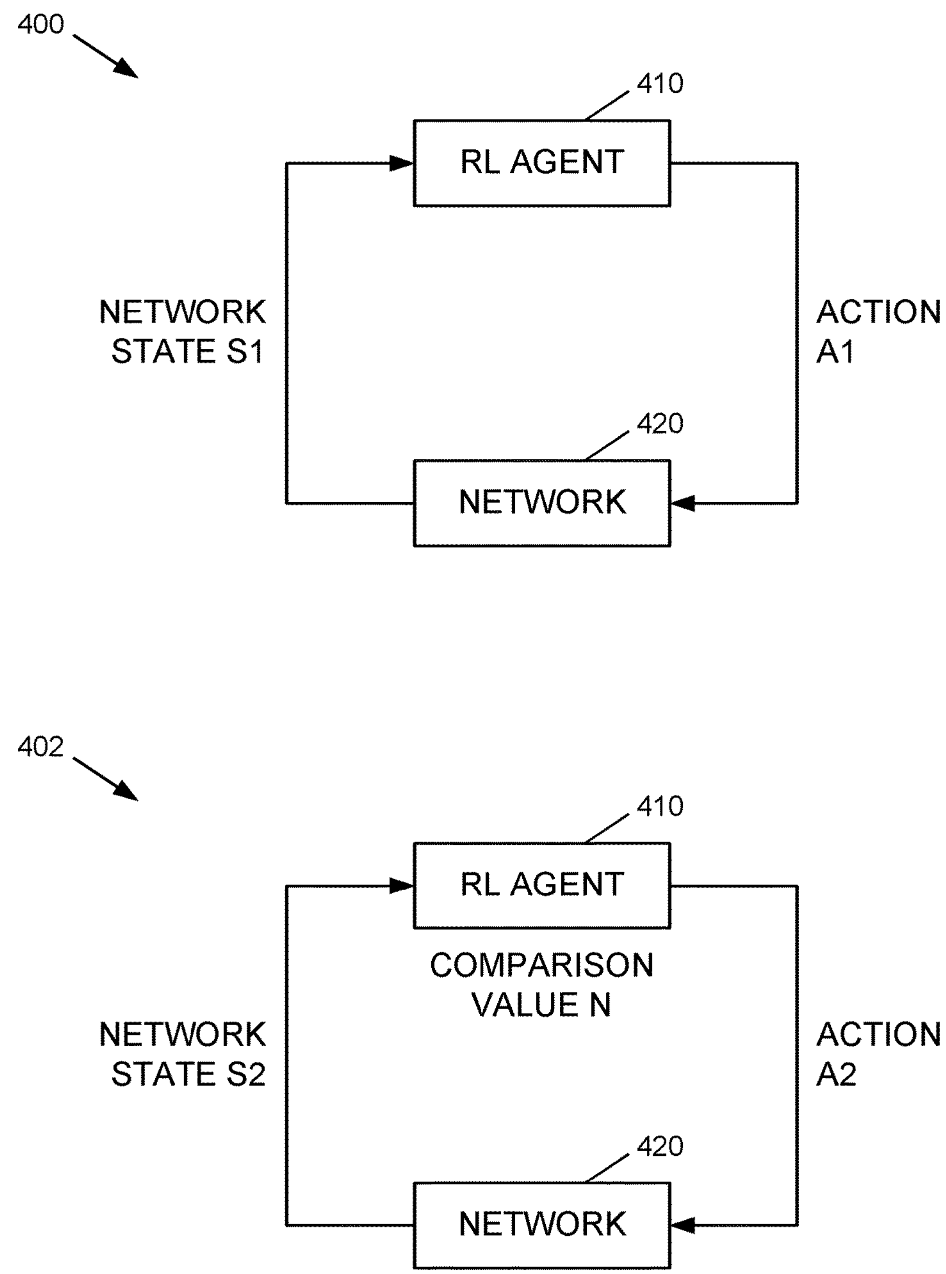
FIG. 4 is a diagram depicting an example machine learning process that can be utilized by the systems of FIGS. 2-3.

Diagrams 400 and 402 in FIG. 4 depicts an example machine learning process that can be utilized in accordance with various embodiments herein, e.g., by the reinforcement learning component 240 and/or the reinforcement learning agent 340. The operations depicted in FIG. 4 are described with respect to a reinforcement learning (RL) agent 410 and a network 420. However, in some implementations, the operations described herein could be performed by other components in addition to, or in place of, the reinforcement learning agent 410 and/or network 420.

In an aspect, the reinforcement learning agent 410 can utilize the actions shown in FIG. 4 to learn how to implement a given network policy. As first shown by diagram 400, the reinforcement learning agent 410 can observe a first state S1 of the network 420 and/or one or more devices within the network 420. State S1 can be based on factors which can include, but are not limited to, the number of UEs in the network 420, applications utilized within the network 420 and/or their respective throughput, signal power associated with one or more devices in the network 420, etc. Based on the observed state of the network 420, the reinforcement learning agent 410 can cause an action A1 to be taken by the network 420, by, for example, instructing a UE to perform a handoff or to abstain from performing a handoff.

Next, as shown by diagram 402, the reinforcement learning agent 410 can observe a second state S2 of the network 420, e.g., a state of the network 420 in response to action A1 being taken. The reinforcement learning agent 410 can then compare the observed states S1 and S2 and compute and/or otherwise obtain an adjustment value N in response to the comparison. The computed adjustment value N can be used by the reinforcement learning agent 410 to adjust expected utilities corresponding with taking various actions in network state S1 and/or S2, which can then be utilized for subsequent actions, e.g., an action A2 performed for state S2 and/or a different network state after computing the adjustment value N.

In an aspect, actions with a net positive impact on network performance can be given a positive reward, while actions with a net negative impact on network performance can be given a negative reward (punishment). As a result, the reinforcement learning agent 410 can adjust itself, learn patterns and optimize the system given an optimization function. For instance, the reinforcement learning agent 410 can load-balance users and/or devices in the network in order to optimize overall network throughput through a targeted handover of users within the network, which may occur between APs and/or cells of a single radio access technology or between APs and/or cells of multiple radio access technologies in a heterogeneous network.

In an aspect, the reinforcement learning agent 410 can continuously perform machine learning to update relationships between network states and actions. For example, if the network policy changes (e.g., as determined based on changing reward feedback), the reinforcement learning agent 410 can learn how to implement the new policy. Also or alternatively, if the network itself changes (e.g., due to a special event, a network or device failure, etc.), the reinforcement learning agent 410 can learn how to correct actions in the new environment.

Figure 5:
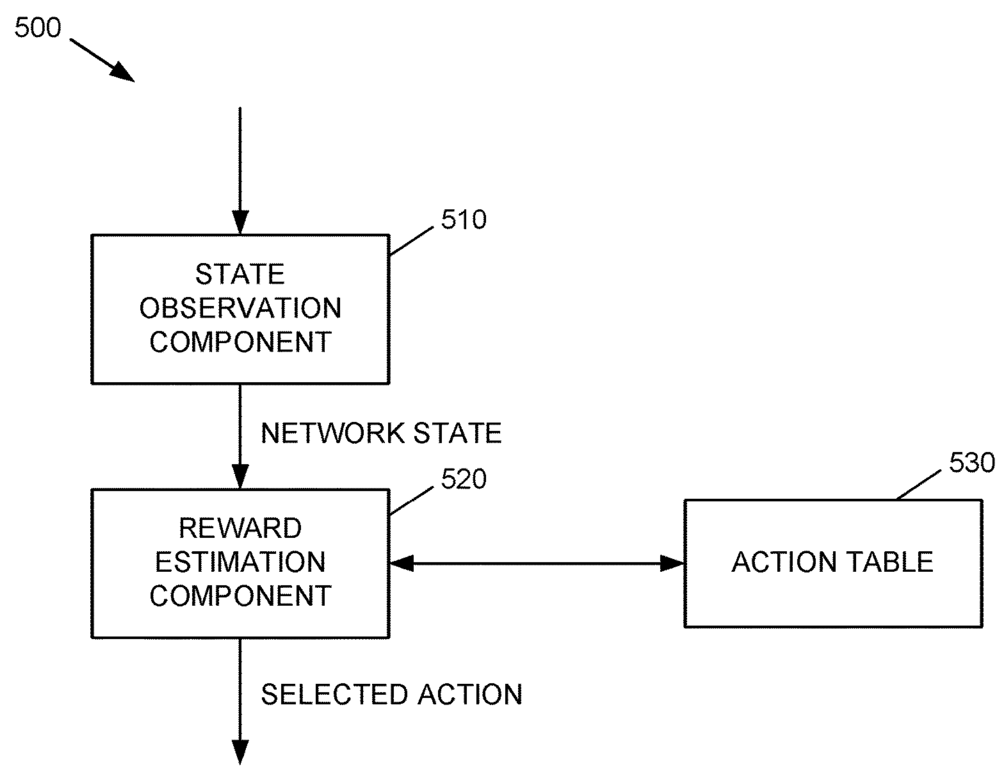
FIG. 5 is a block diagram of a system that utilizes a reinforcement learning process for mobility management.
Figure 6:
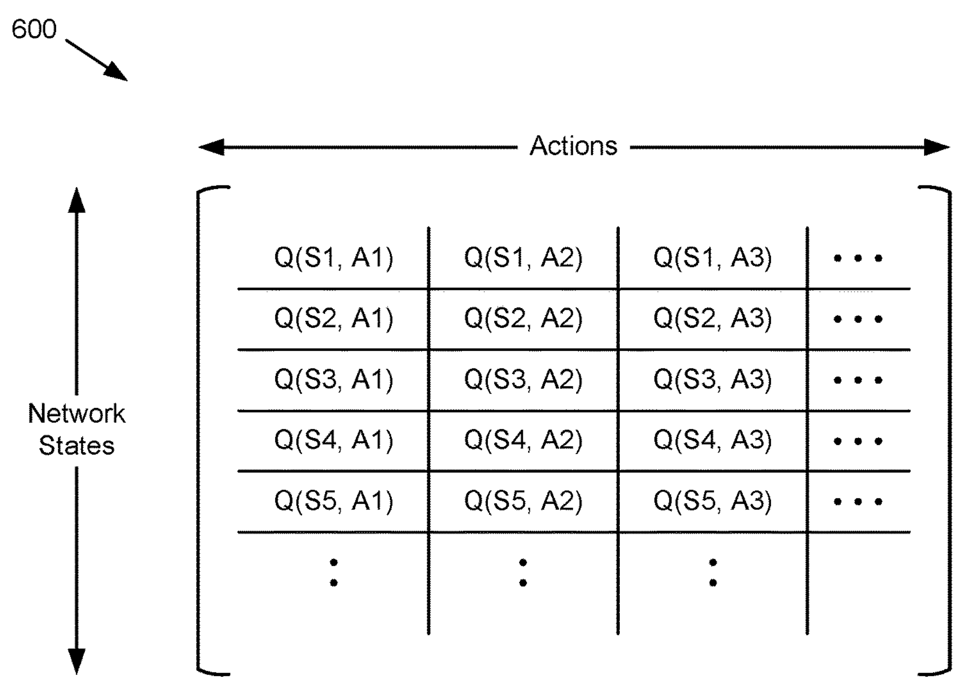
FIG. 6 is a diagram depicting an example state/action table that can be utilized by the system of FIG. 5.

With reference next to FIGS. 5-6, and with further reference to FIG. 4, illustrated are example machine learning techniques and related data structures that can be utilized to manage network actions, such as handoffs or the like, within a wireless communication network. It should be appreciated, however, that FIGS. 5-6 illustrate merely non-limiting examples of techniques that can be employed in accordance with various embodiments herein and that other techniques could also be used.

In an aspect, the reinforcement learning agent 410 can employ Q-learning to coordinate its associated network 420. Q-learning is a model-free reinforcement learning technique that can be used to find an optimal action-selection policy for any given (finite) Markov decision process. Q-learning can be utilized by the reinforcement learning agent 410 to compare the expected utility of respective available actions without a model of the corresponding environment.

In another aspect, a specific, non-limiting example of a Q-learning framework that can be employed by the reinforcement learning agent 410 is as follows. The framework can operate according to the following:

$$Q(s_t,a_t)\leftarrow Q(s_t,a_t)+a_t\times(r_{t+1}+\gamma\max_a Q(s_{t+1},a)-Q(s_t,a_t)).$$

In the above, $Q(s_t,a_t)$ is the expected utility for state S and action A at time t, and $r_{t+1}$ is the reward function $R(s_{t+1},a_{t+1})$ for state S and action A at time t+1.

As further shown in the above, $\alpha$ is the learning rate, which can be set between 0 and 1 inclusively. At $\alpha=0$, the reinforcement learning agent 410 performs no learning, while at $\alpha=1$, the reinforcement learning agent 410 has no memory of past actions.

As additionally shown above, $\gamma$ represents a discount factor, which can also be set between 0 and 1 inclusively. At $\gamma=0$, the reinforcement learning agent 410 considers only the next action, while at $\gamma=1$, the reinforcement learning agent 410 is configured to optimize a long-term reward based on an estimate of an optimal expected utility, given as $\max_a Q(s_{t+1},a)$. In an aspect, Q can be configured as a two-dimensional array having a first dimension defined by states and a second dimension defined by actions. Entries in the array, Q(S, A), can thus correspond to a learned estimated reward for action A when in state S.

The reinforcement learning agent 410 can utilize the above techniques to manage handoffs by UEs in the network 420 to and from respective APs in the network 420. Thus, for each UE in the network 420, the range of potential actions can include performing no action (e.g., remaining on a current serving AP) or handing off to another AP in the network 420.

Turning to FIG. 5, a system 500 is illustrated that facilitates selection of an action using the techniques described above with respect to FIG. 4. In an aspect, system 500 can be employed, either wholly or in part, by the action selection component 220 as described above with respect to FIG. 2. The system 500 includes a state observation component 510, which identifies one or more operating characteristics of an associated communication network and/or devices in the network. These characteristics can include, but are not limited to, UE properties such as the AP and/or cell to which a UE is currently connected, a signal power used by a UE, an application and/or service endpoint associated with a UE, a determination of whether a quality of service threshold is currently met for a UE, a number of other UEs connected to the serving AP and/or cell for a given UE, or the like. Also or alternatively, these characteristics can include cell properties such as number and/or identity of respective UEs connected to respective cells, quality of service thresholds associated with respective cells, a signal power utilized by respective cells, etc. Other characteristics, such as properties of the network at large, characteristics of respective core network devices, etc., could also be used.

The network state observed and defined by the state observation component 510 can be provided to a reward estimation component 520, which determines an action corresponding to the network and/or one or more devices in the network (e.g., a UE) and the provided state that provides an estimated reward that is greater than or equal to a threshold. The threshold can be an absolute threshold or a relative threshold, e.g., a highest estimated reward or an estimated reward that is no more than a threshold amount less than the highest estimated reward. For an action corresponding to a UE in the network, the determination by the reward estimation component 520 results in a selected action for the UE, which can be relayed to the UE either directly or indirectly (e.g., via the serving AP or cell for the UE).

In an aspect, the action space Q(S, A) associated with system 500 can be constructed as an M×N array, where M is the number of potential states of the network 420 and N is the number of potential actions. This array is stored at an action table 530 and/or another suitable data structure. A visual representation of the array is provided by diagram 600 in FIG. 6, which contains expected utilities Q(S, A) corresponding to respective actions A1-AN for a set of network states S1-SN. As shown, each cell in the Q(S, A) table represents the expected reward for taking action A while in state S. Thus, the reinforcement learning agent 410 can operate to increase or maximize the obtained reward for a given UE and/or other network devices at a given time.

As noted above, while diagram 600 in FIG. 6 illustrates the action table 530 constructed as a two-dimensional array, other structures could also be utilized for the action table 530. In addition, the action table 530 in some cases can be constructed as a function, AI network, and/or other means for relating network states to network actions without the use of an associated data structure. Other configurations for the action table 530 could also be used.

Returning to FIG. 4, the reinforcement learning agent 410 can generate the component action spaces, e.g., the action table 530, using a two-phase process having an exploring phase and an exploiting phase. In the exploring phase, the reinforcement learning agent 410 can initially populate the action table 530 by selecting respective actions for respective states and initializing cells in the action table 530 based on the received reward signals. In the exploiting phase, the reinforcement learning agent 410 can utilize a substantially populated action space to select appropriate network actions in accordance with various techniques as described above.

As stated above, an objective of the reinforcement learning agent 410 is to increase or maximize a reward associated with a selected network action. In one example, the reward signal given in response to a selected action can be based on compliance of the selected action to an applicable network policy. The reward signal can also be based on multiple factors, e.g., as a sum of applicable factors. For instance, a first positive reward can be added to the reward signal if a threshold service quality for the associated UE is met. Similarly, a second positive reward can be added to the reward signal if a threshold service quality for a group of UEs, e.g., some or all UEs served by the serving cell for the associated UE resulting from the selected action, is met. As another example, a third positive reward can be added to the reward signal if the associated UE is instructed to stay on its current serving cell in order to mitigate resource usage associated with excessive handoffs.

Some or all of the above factors, and/or other suitable factors, can be applied to a reward signal associated with a given action. In addition to positive rewards, negative rewards (punishments) could also be applied. For instance, a negative reward could be added to the reward signal if a handoff is selected in addition to, or in place of, the positive reward added for not selecting a handoff. Other techniques for computing the reward signal could also be employed.

In an aspect, the techniques shown and described above can be extended to optimize a communication network on various ISO (International Standard for Organization) OSI (Open Systems Interconnection) layers. For instance, layer 1 optimizations could include signal strength, beam forming, cell breathing, and/or carrier aggregation; layer 2 optimizations could include adaptive error correction; and layer 3 optimizations could include user mobility in a multi-RAT environment. Other optimizations could also be performed.

Figure 7:
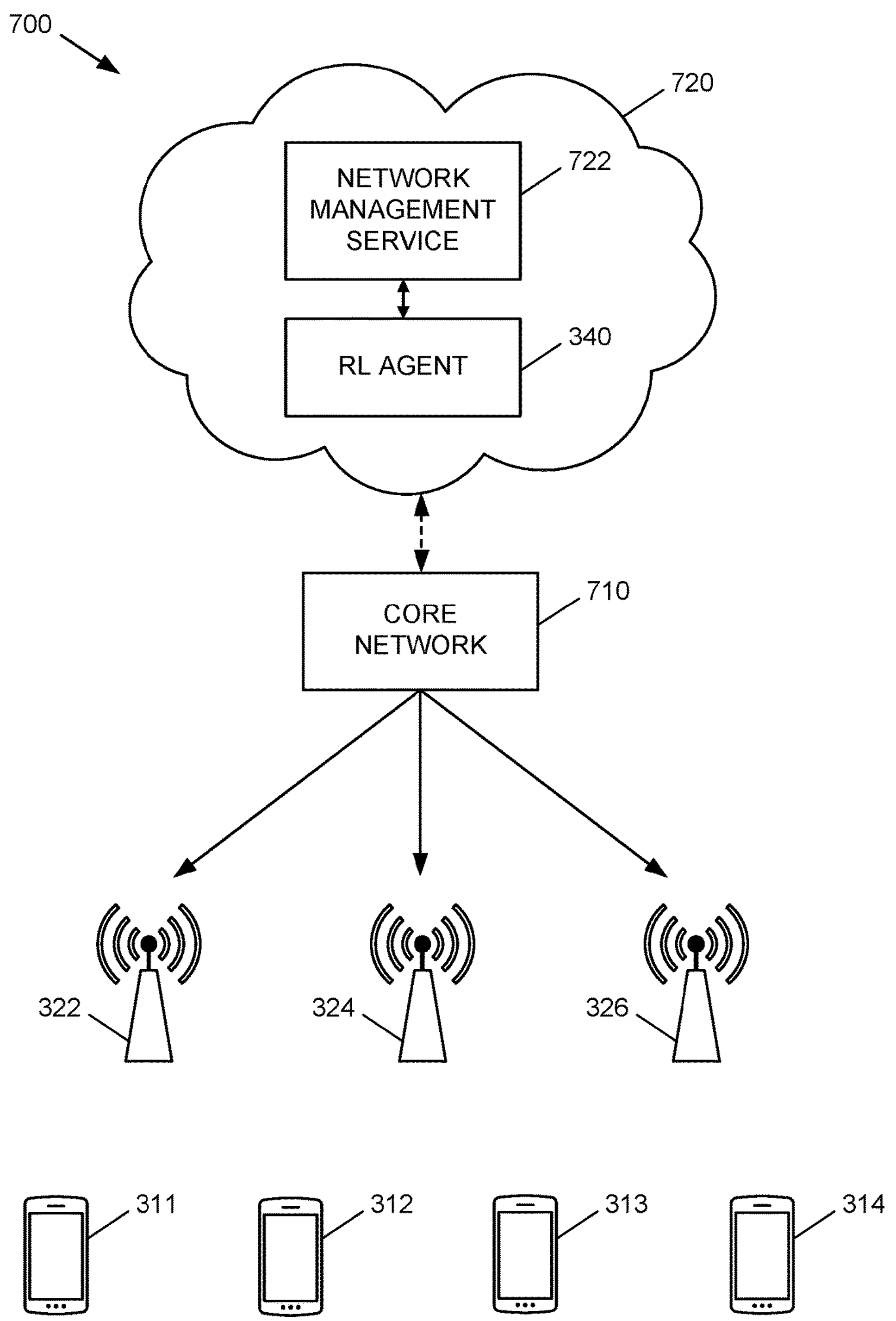
FIG. 7 is a diagram depicting a wireless communication network that utilizes a cloud-based service for network mobility management using reinforcement learning.

Turning next to FIG. 7, diagram 700 illustrates a wireless communication network in which reinforcement learning-based network management as described above is provided via a cloud service and/or a similar service platform. The network illustrated in diagram 700 includes one or more UEs 311-314 and one or more APs 322-326, which can operate in a similar manner as described above with respect to FIG. 3. The network further includes a core network 710, which can provide various switching, support, and/or other functions for other devices in the network. While the core network 710 is shown as a single block in FIG. 7 for brevity of illustration, it should be appreciated that the core network 710 can be implemented via multiple network devices and/or nodes, which may be located at a single physical device or distributed among multiple physical devices.

As further shown by FIG. 7, the core network 710 can serve to communicatively couple the devices of the network to one or more data networks, such as an Internet Protocol (IP) network 720. Here, the IP network 720 is associated with a network management service 722 that utilizes the RL agent 340 for network management in accordance with various aspects as described herein. In one example, the network management service 722 is a cloud computing service that at least partially manages the flow of network traffic through the associated network. Other implementations are also possible.

Figure 8:
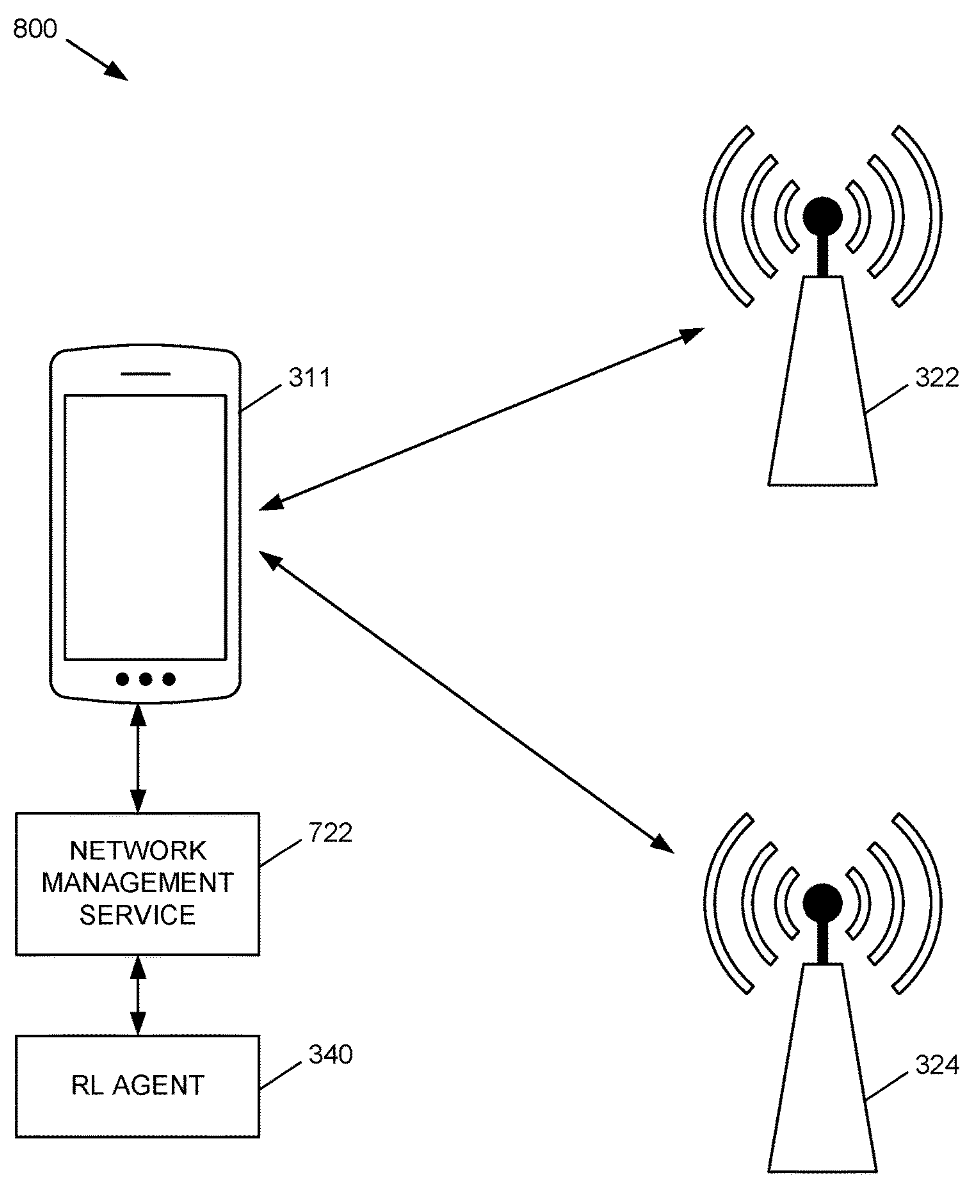
FIG. 8 is a diagram depicting a wireless communication network that utilizes mobile-initiated network mobility management using reinforcement learning.

Referring next to FIG. 8, another diagram 800 is provided that illustrates a communication network utilizing mobile-initiated network management. The network shown in FIG. 8 includes a UE 311 that can communicate with one or more APs 322, 324. The UE 311 has implemented thereon a network management service 722 and RL agent 340, which can operate in accordance with various aspects described herein to optimize and/or otherwise manage network resources associated with the UE 311. For instance, the network management service 722 can cause the UE 311 to negotiate a handoff from a serving AP, e.g., AP 322, to a new AP, e.g., AP 324, under various circumstances such as those described above.

Figure 9:
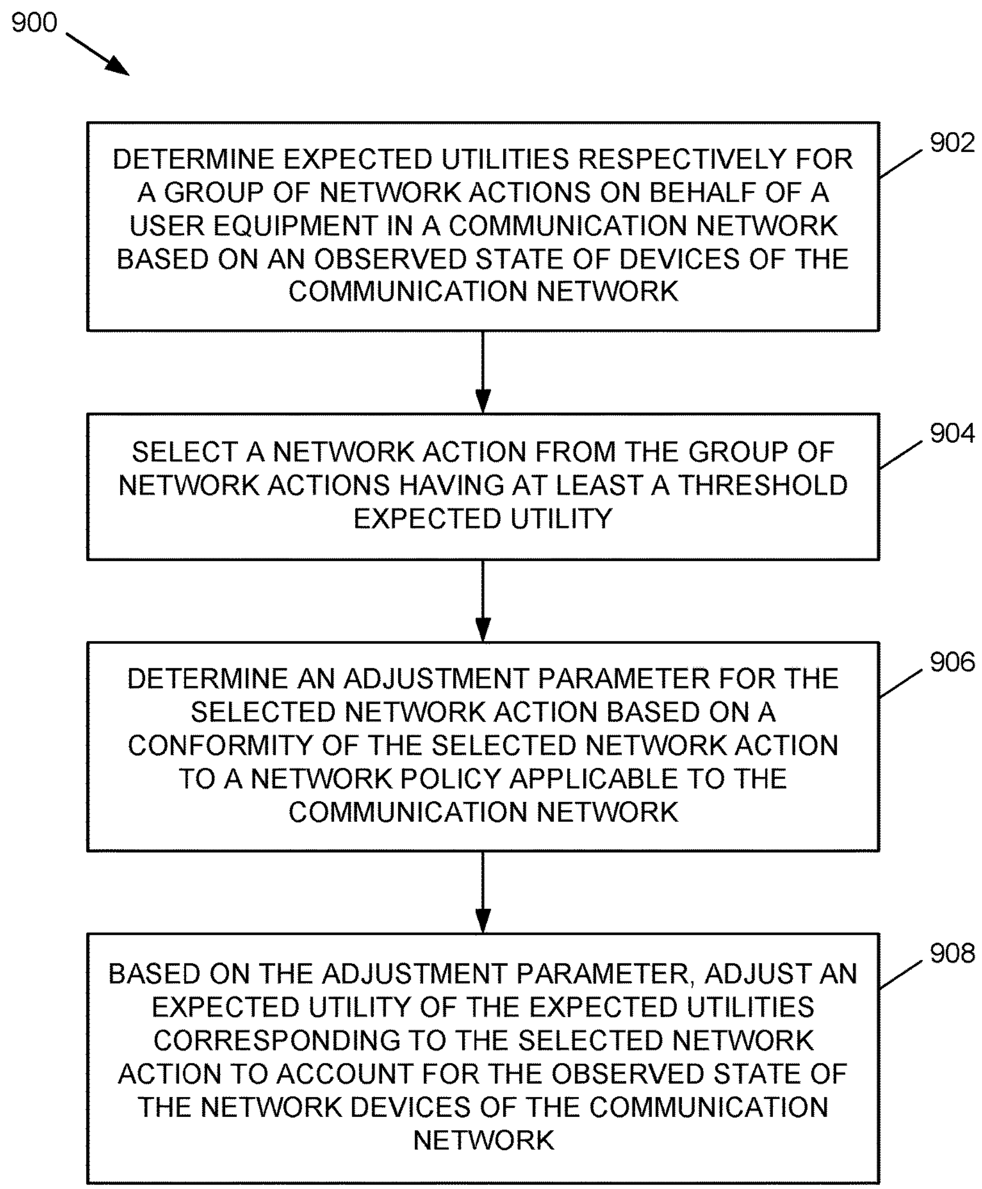
FIGS. 9-10 are flow diagrams of respective methods for mobility management in a wireless communication network.
Figure 10:
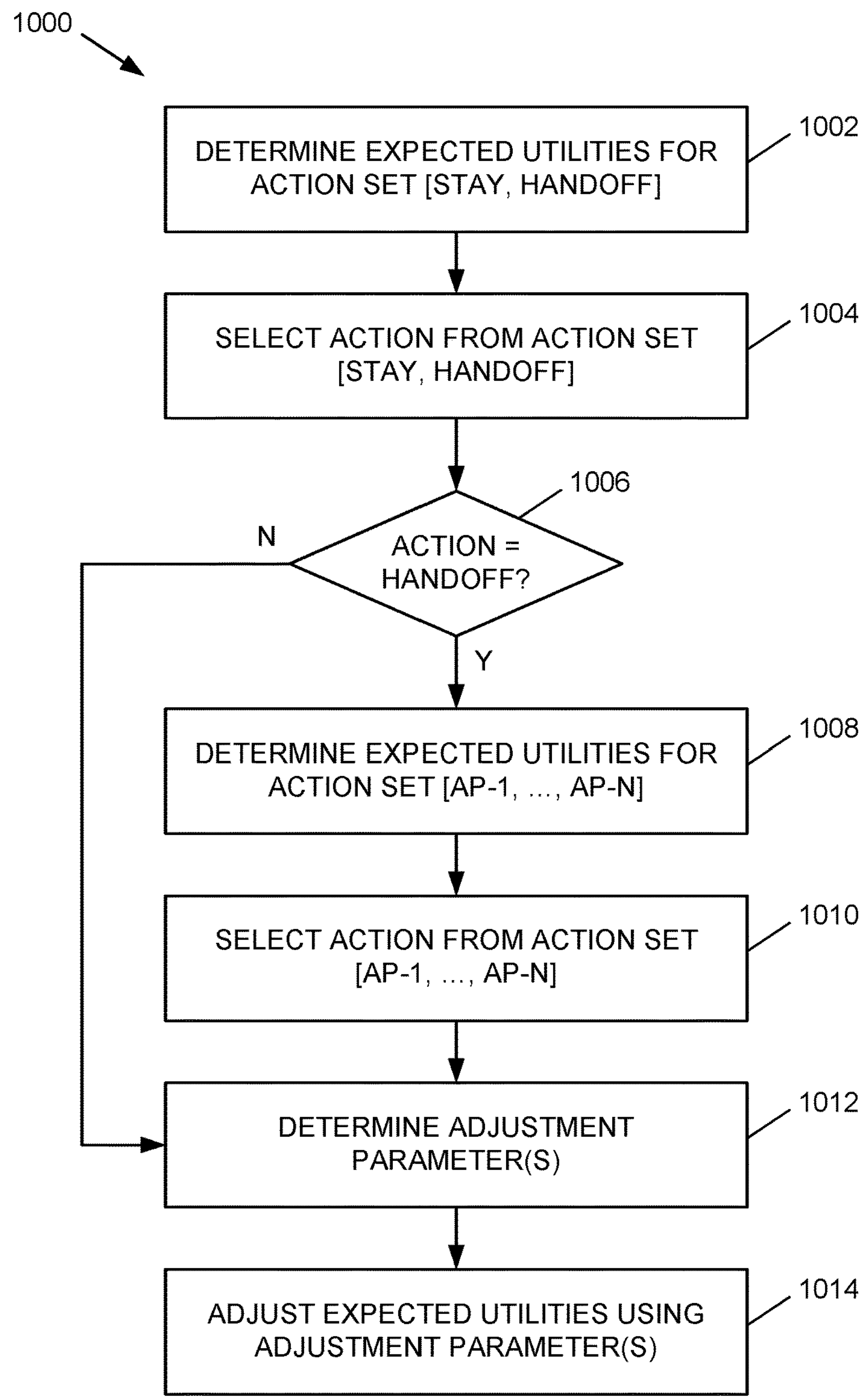

FIGS. 9-10 illustrate respective methods in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference first to FIG. 9, presented is a flow diagram of a process 900 for mobility management in a wireless communication network. At 902, expected utilities are determined (e.g., by the action selection component 220) respectively for a group of network actions on behalf of a user equipment in a communication network based on an observed state of devices of the communication network (e.g., as observed by the network observation component).

At 904, a network action is selected (e.g., by the action selection component 220) from the group of network actions having at least a threshold expected utility.

At 906, an adjustment parameter (e.g., a reward signal and/or other information) is determined (e.g., by the reinforcement learning component 240) for the network action selected at 904 based on a conformity of the selected network action to a network policy applicable to the communication network.

At 908, based on the adjustment parameter determined at 906, an expected utility of the expected utilities corresponding to the selected network action is adjusted (e.g., by the reinforcement learning component 240) to account for the observed state of the network devices of the communication network.

Turning next to FIG. 10, presented is a flow diagram of another process 1000 for mobility management in a wireless communication network. In particular, process 1000 illustrates a case in which the action space for a given UE is split into two separate action spaces: a first action space corresponding to UE states and the actions of either staying on a current cell or handing off to a different cell, and a second action space corresponding to cell states and the action of handing off to the corresponding cell.

At 1002, expected utilities for a first action set composed of staying on a current cell or handing off to a different cell based on an observed state of the network are determined. At 1004, an action is selected from the first action set based on the expected utilities determined at 1002. In an aspect, the action space associated with the selection at 1004 can be expressed an N×2 array, where N is equal to the number of potential states of the network.

At 1006, if the action selected at 1004 was a handoff, selection of an appropriate action for a given UE can proceed to a second phase beginning at 1008. Otherwise, the process 1000 proceeds to 1012 as described below.

At 1008, expected utilities are determined for a second action set composed of a set of candidate target cells for the handoff selected at 1004. At 1010, an action is selected from the second action set based on the expected utilities determined at 1008. In an aspect, the selection at 1008 can be performed by observing one or more characteristics associated with states of respective candidate target cells for the handoff and selecting an appropriate candidate target cell based on the observed characteristics. Candidate target cells for the handoff can be selected based on distance from the UE and/or other factors. Additionally, the action space for a given candidate target cell can be expressed as an N×1 array, where N is equal to the number of potential states of the network.

At 1012, following the selections at 1004 and 1010, one or more adjustment parameters, e.g., rewards and/or punishments, are determined for the selected action(s). At 1014, the expected utilities associated with the selected action(s) and the observed state of the network are adjusted using the one or more adjustment parameters determined at 1012.

Figure 11:
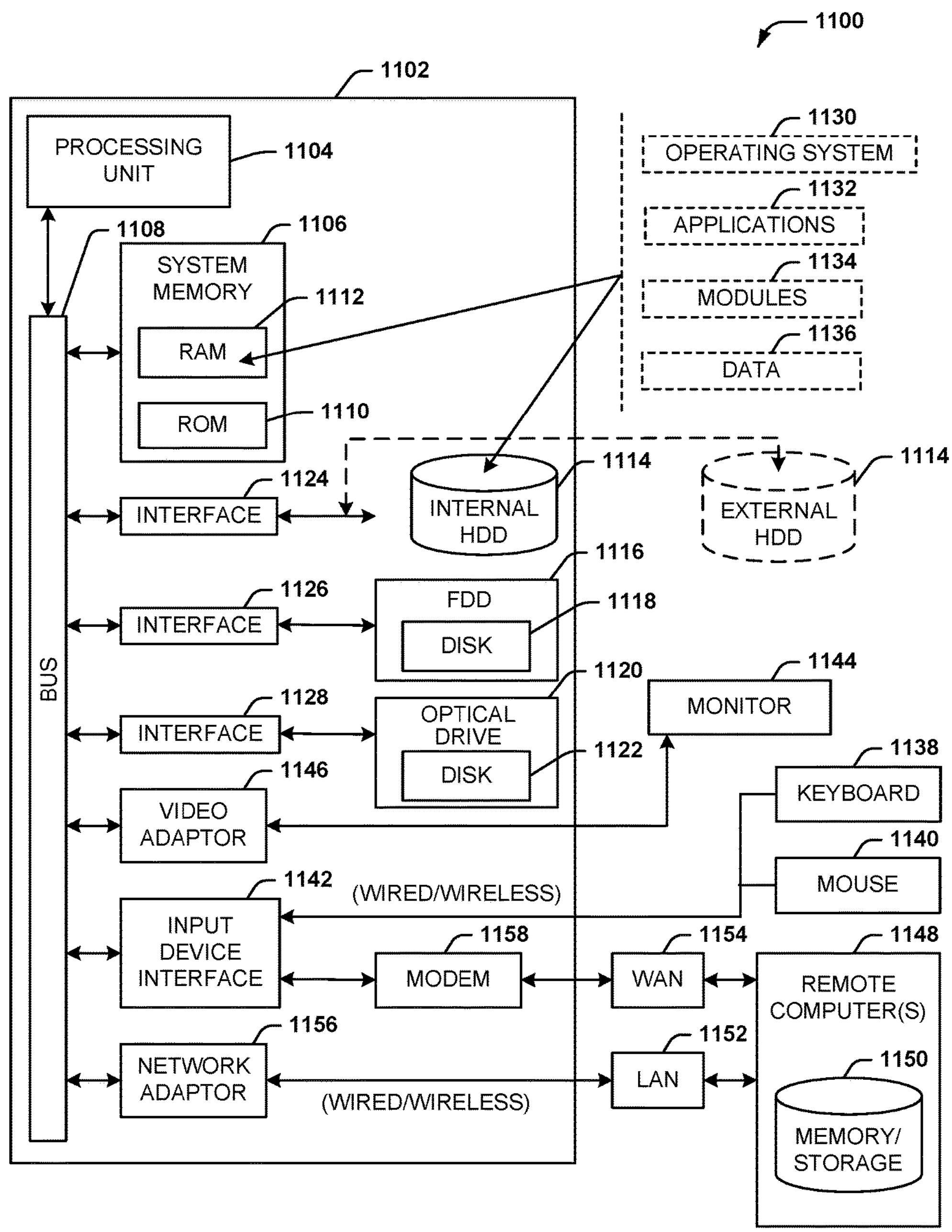
FIG. 11 is a diagram of an example computing environment in which various embodiments described herein can function.

Referring now to FIG. 11, there is illustrated a block diagram of a computing environment in accordance with various aspects described herein. For example, in some embodiments, the computer can be or be included within the network management devices 130, 330 and/or the reinforcement learning agents 340, 402.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a device comprising a processor, expected utilities respectively for a group of network actions on behalf of a user equipment in a communication network based on an observed state of network devices of the communication network, the group of network actions comprising remaining on a serving access point device of the network devices and engaging in a handoff from the serving access point device to a target access point device of the network devices;

selecting, by the device, a network action from the group of network actions having at least a threshold expected utility, resulting in a selected network action;

determining, by the device, an adjustment parameter for the selected network action based on a conformity of the selected network action to a network policy applicable to the communication network; and based on the adjustment parameter, adjusting, by the device, an expected utility of the expected utilities corresponding to the selected network action to account for the observed state of the network devices of the communication network.

2. The method of claim 1, wherein the expected utilities are first expected utilities, wherein the threshold expected utility is a first threshold expected utility, wherein the selected network action is the engaging in the handoff from the serving access point device to the target access point device, and wherein the method further comprises:

determining, by the device, second expected utilities respectively for a group of candidate target access point devices of the network devices for the handoff based on the observed state of the network devices of the communication network; and selecting, by the device, a target access point device from the group of candidate target access point devices having at least a second threshold expected utility, resulting in a selected target access point device.

3. The method of claim 2, wherein the adjustment parameter is a first adjustment parameter, wherein the conformity to the network policy is a first conformity to the network policy, wherein the expected utility corresponding to the selected network action is a first expected utility, and wherein the method further comprises:

determining, by the device, a second adjustment parameter for the selected target access point device based on a second conformity of the handoff to the selected target access point device to the network policy applicable to the communication network; and adjusting, by the device, a second expected utility of the second expected utilities corresponding to the selected target access point device to account for the observed state of the communication network based on the second adjustment parameter.

4. The method of claim 1, further comprising:

instructing, by the device, the user equipment to take the selected network action; and determining, by the device, the adjustment parameter in response to the selected action being determined to have been taken by the user equipment.

5. The method of claim 1, wherein the determining comprises determining the adjustment parameter based on a quality of service observed by the user equipment resulting from the selected network action.

6. The method of claim 1, further comprising analyzing, by the device, operating parameters of the network devices of the communication network, resulting in the observed state of the network devices of the communication network.

7. The method of claim 6, wherein the analyzing comprises analyzing an operating parameter of the serving access point device, the operating parameter of the serving access point device comprising at least one of a number of user equipment connections to the serving access point device, a communication capacity of the serving access point device, or a physical location of the serving access point device.

8. The method of claim 6, wherein the analyzing comprises analyzing an operating parameter of the user equipment, the operating parameter of the user equipment comprising at least one of the serving access point device for the user equipment, an application throughput requested by the user equipment, a physical location of the user equipment, or a transmit power level utilized by the user equipment.

9. The method of claim 1, wherein the selected network action is the engaging in the handoff from the serving access point device to the target access point device, wherein the serving access point device is associated with a first radio access technology, and wherein the second access point device is associated with a second radio access technology that is distinct from the first radio access technology.

10. The method of claim 1, wherein the selecting comprises selecting a network action from the group of network actions having a highest expected utility.

11. A system, comprising:

a processor; and a memory that stores executable instructions that, when executed by the processor, facilitate performance of operations, the operations comprising:

determining expected utilities respectively for a group of network actions on behalf of a user equipment in a communication network based on an observed state of network devices of the communication network, the group of network actions comprising remaining on a serving access point device of the network devices and engaging in a handoff from the serving access point device to a target access point device of the network devices;

selecting a network action from the group of network actions having at least a threshold expected utility, resulting in a selected network action;

determining an adjustment parameter for the selected network action based on a conformity of the selected network action to a network policy applicable to the communication network; and based on the adjustment parameter, adjusting an expected utility of the expected utilities corresponding to the selected network action to account for the observed state of the network devices of the communication network.

12. The system of claim 11, wherein the expected utilities are first expected utilities, wherein the threshold expected utility is a first threshold expected utility, wherein the selected network action is the engaging in the handoff from the serving access point device to the target access point device, and wherein the operations further comprise:

determining second expected utilities respectively for a group of candidate target access point devices of the network devices for the handoff based on the observed state of the network devices of the communication network; and selecting a target access point device from the group of candidate target access point devices having at least a second threshold expected utility, resulting in a selected target access point device.

13. The system of claim 12, wherein the adjustment parameter is a first adjustment parameter, wherein the conformity to the network policy is a first conformity to the network policy, wherein the expected utility corresponding to the selected network action is a first expected utility, and wherein the operations further comprise:

determining a second adjustment parameter for the selected target access point device based on a second conformity of the handoff to the selected target access point device to the network policy applicable to the communication network; and adjusting a second expected utility of the second expected utilities corresponding to the selected target access point device to account for the observed state of the communication network based on the second adjustment parameter.

14. The system of claim 11, wherein the operations further comprise:

determining the adjustment parameter based on a quality of service observed by the user equipment resulting from the selected network action.

15. The system of claim 11, wherein the operations further comprise:

analyzing operating parameters of the network devices of the communication network, resulting in the observed state of the network devices of the communication network.

16. The system of claim 15, wherein the operations further comprise:

analyzing an operating parameter of the serving access point device, the operating parameter of the serving access point device comprising at least one of a number of user equipment connections to the serving access point device, a communication capacity of the serving access point device, or a physical location of the serving access point device.

17. The system of claim 15, wherein the operations further comprise:

analyzing an operating parameter of the user equipment, the operating parameter of the user equipment comprising at least one of the serving access point device for the user equipment, an application throughput requested by the user equipment, a physical location of the user equipment, or a transmit power level utilized by the user equipment.

18. A machine-readable storage medium, comprising executable instructions that, when executed by a processor, facilitate performance of operations, comprising:

determining expected utilities respectively for a group of network actions on behalf of a user equipment in a communication network based on an observed state of network devices of the communication network, the group of network actions comprising remaining on a serving access point device of the network devices and engaging in a handoff from the serving access point device to a target access point device of the network devices;

selecting a network action from the group of network actions having at least a threshold expected utility, resulting in a selected network action;

determining an adjustment parameter for the selected network action based on a conformity of the selected network action to a network policy applicable to the communication network; and based on the adjustment parameter, adjusting an expected utility of the expected utilities corresponding to the selected network action to account for the observed state of the network devices of the communication network.

19. The machine-readable storage medium of claim 18, wherein the expected utilities are first expected utilities, wherein the threshold expected utility is a first threshold expected utility, wherein the selected network action is the engaging in the handoff from the serving access point device to the target access point device, and wherein the operations further comprise:

determining second expected utilities respectively for a group of candidate target access point devices of the network devices for the handoff based on the observed state of the network devices of the communication network; and selecting a target access point device from the group of candidate target access point devices having at least a second threshold expected utility, resulting in a selected target access point device.

20. The machine-readable storage medium of claim 19, wherein the adjustment parameter is a first adjustment parameter, wherein the conformity to the network policy is a first conformity to the network policy, wherein the expected utility corresponding to the selected network action is a first expected utility, and wherein the operations further comprise:

determining a second adjustment parameter for the selected target access point device based on a second conformity of the handoff to the selected target access point device to the network policy applicable to the communication network; and adjusting a second expected utility of the second expected utilities corresponding to the selected target access point device to account for the observed state of the communication network based on the second adjustment parameter.

* * * * *